April 29, 1930.  H. A. WEBSTER  1,756,268
BLOCK PRINTING MACHINE
Filed Aug. 17, 1928   9 Sheets-Sheet 2

April 29, 1930.  H. A. WEBSTER  1,756,268
BLOCK PRINTING MACHINE
Filed Aug. 17, 1928   9 Sheets-Sheet 4

INVENTOR
Harry A. Webster
By Byrnes, Stebbins & Parmelee
His Attys.

April 29, 1930.   H. A. WEBSTER   1,756,268
BLOCK PRINTING MACHINE
Filed Aug. 17, 1928   9 Sheets-Sheet 5

INVENTOR

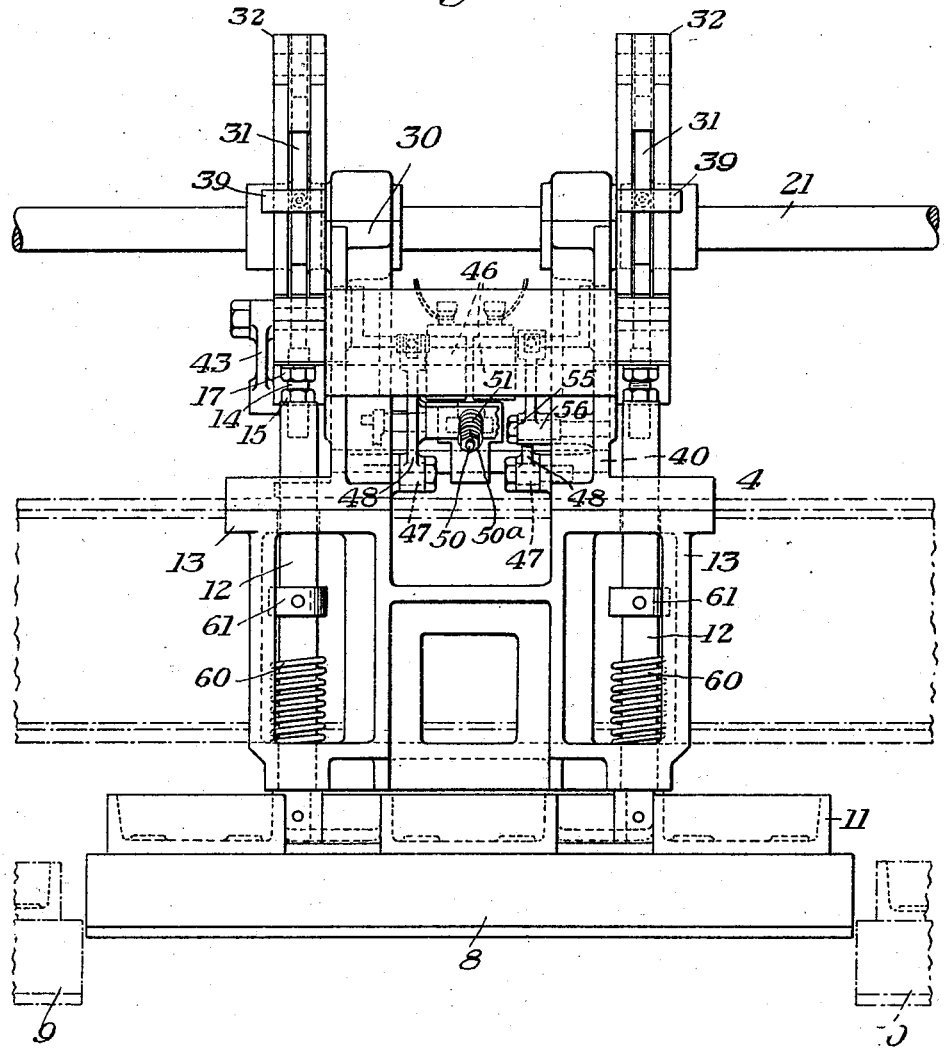

April 29, 1930.  H. A. WEBSTER  1,756,268
BLOCK PRINTING MACHINE
Filed Aug. 17, 1928   9 Sheets-Sheet 7

INVENTOR
Harry A. Webster
By Byrnes, Stebbins & Parmelee,
His Attys.

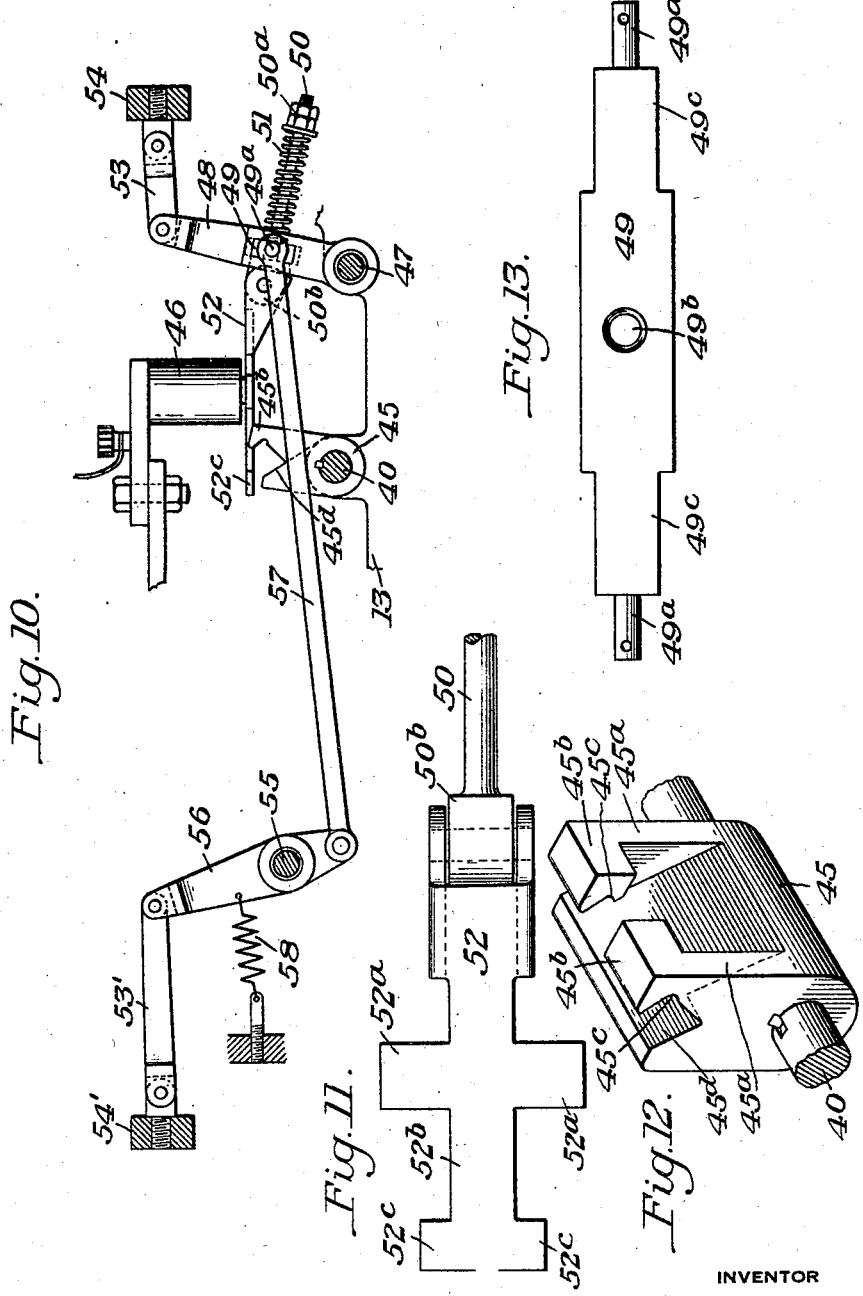

April 29, 1930. H. A. WEBSTER 1,756,268
BLOCK PRINTING MACHINE
Filed Aug. 17, 1928  9 Sheets-Sheet 9
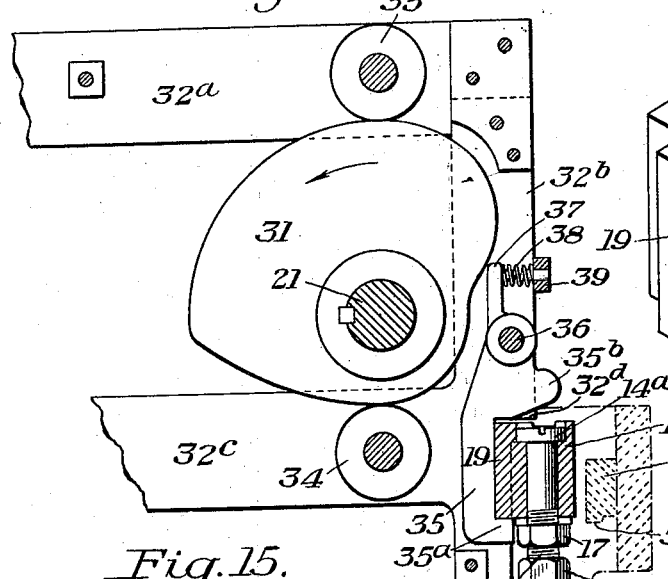
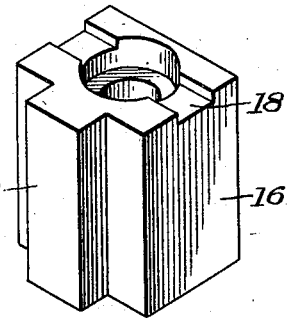
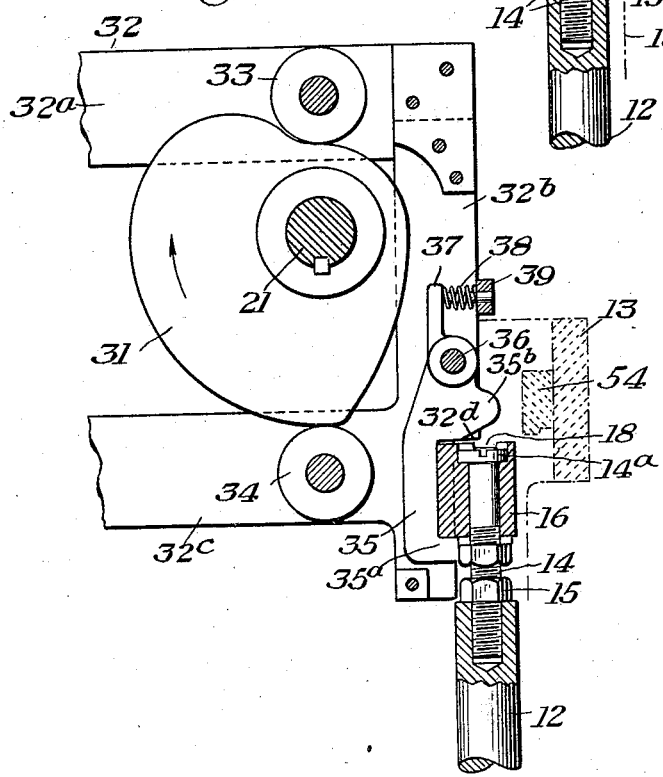
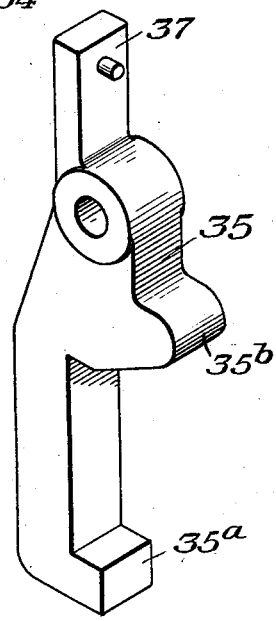
INVENTOR
Harry A. Webster
By Byrnes, Stebbins & Parmelee
his Attys.

Patented Apr. 29, 1930

1,756,268

UNITED STATES PATENT OFFICE

HARRY A. WEBSTER, OF LANCASTER, PENNSYLVANIA, ASSIGNOR TO ARMSTRONG CORK COMPANY, OF LANCASTER, PENNSYLVANIA, A CORPORATION OF PENNSYLVANIA

BLOCK PRINTING MACHINE

Application filed August 17, 1928. Serial No. 300,210.

This invention relates to the art of printing, and more particularly printing machines of the vertically reciprocating block type used in the printing of linoleum and felt base floor coverings and the like.

In a co-pending application of William Penn Brinton, Serial No. 247,319 filed January 17, 1928, there is disclosed a block printing machine wherein one or more of the vertically reciprocable printing heads are provided with a plurality of individually movable sections or blocks. That is, instead of the head carrying a single block, it carries a plurality of individual blocks, giving in effect a sectional block. Each one of these individual blocks or sections may be separately operated into and out of printing position.

In my co-pending application, Serial No. 278,811 filed May 18, 1928, there is disclosed a multiple block printing head, of the type referred to, with a mechanism for effecting the operation of the individual blocks and sections into and out of printing position. In the machine disclosed in my said application, each of the individual blocks is mounted on the reciprocable head in such a way that it has a relative vertical movement on the head. When it is desired to use a given section for printing, the mechanism on the head operates to depress the section which is to be used below the plane of the section or blocks which are not to be used.

When the head descends to print, only the section or sections which have been depressed will come into contact with the material to be printed upon. In the construction shown in said application, the blocks are depressed to operative position by means of overhead cams on the printing head against the resistance of compression springs, the springs being strong enough to normally hold the blocks in inoperative position.

The sequence of operation of the individual block sections in such a construction depended entirely upon the shape of the overhead cams. The cams for depressing different individual blocks or sections are carried on the same cam shaft. Rotation of the cam shaft through a given arc is effected by reciprocation of the head as a whole. If each head were divided into eight individual blocks or sections, at least eight cams were necessary and the variation in the movement of the individual blocks depended entirely upon the shapes of the cams. To secure a change in the sequence of operation of the individual blocks, the shape of the cams had to be changed or an arrangement had to be provided whereby the cam shafts could be rotated to a greater or less extent upon the operation of the printing head.

Neither arrangement is very flexible and does not adapt itself readily to variable operation through the medium of electrically actuated rug trippers. To change the lengths of the rugs being printed, or to change the frequency of repeat, or to effect a re-arrangement of patterns, considerable work on the part of the mechanics operating the machine is necessary.

According to the present invention, there is provided a multiple block printing head having an improved operating mechanism for the individual printing blocks wherein the maintenance of a block in printing position may be effected by a latch. The latch is preferably operated through an electromagnet of some nature. An electromagnet may be provided for each block or section and the sequence of operation of the individual blocks or sections is governed entirely through the electromagnets. This allows for a considerable flexibility in the sequence of operation. The operation of the latches can thus be effected through the action of electric rug trip devices, such for instance as that described in my copending application, Serial No. 388,584 filed August 26, 1929, and the machine operators are not required to change or adjust any of the mechanical parts of the machine to vary the sequence.

According to the present invention the movement of the individual printing block sections both into and out of operative position can be effected by means of a cam, thereby doing away with the compression springs necessary to the operation of the arrangement shown in my former application with the result that less load is imposed on the various parts.

The nature of my invention may be understood by reference to the accompanying drawings which illustrate a present preferred embodiment of my invention, and in which—

Figure 6 is a view similar to Figure 3 of the block operating unit alone and on a slightly larger scale, corresponding to the scale of Figures 4 and 5;

Figure 10 is a detached view of the latch mechanism apart from the rest of the mechanism;

Figure 11 is a top plan view of the combined link and armature through which the latches are operated;

Figure 12 is a detailed perspective view of another part of the latch operating mechanism;

Figure 13 is a detail view of another part of the latch assembly;

Figure 14 is a detail view of the upper part of the mechanism at one side of the block operating unit with the parts in the position which they assume when the printing head is in its lowermost position;

Figure 15 is a similar view showing the position of the parts when the printing head is in its uppermost position;

Figure 16 is a perspective view of one of the latch blocks;

Figure 17 is a perspective view of a lifting hook forming part of the assembly.

It will be understood that the drawings are merely illustrative of a preferred embodiment of the invention, but that the invention may be otherwise embodied and is not limited to the particular construction therein shown and herein specifically described.

Figure 1:
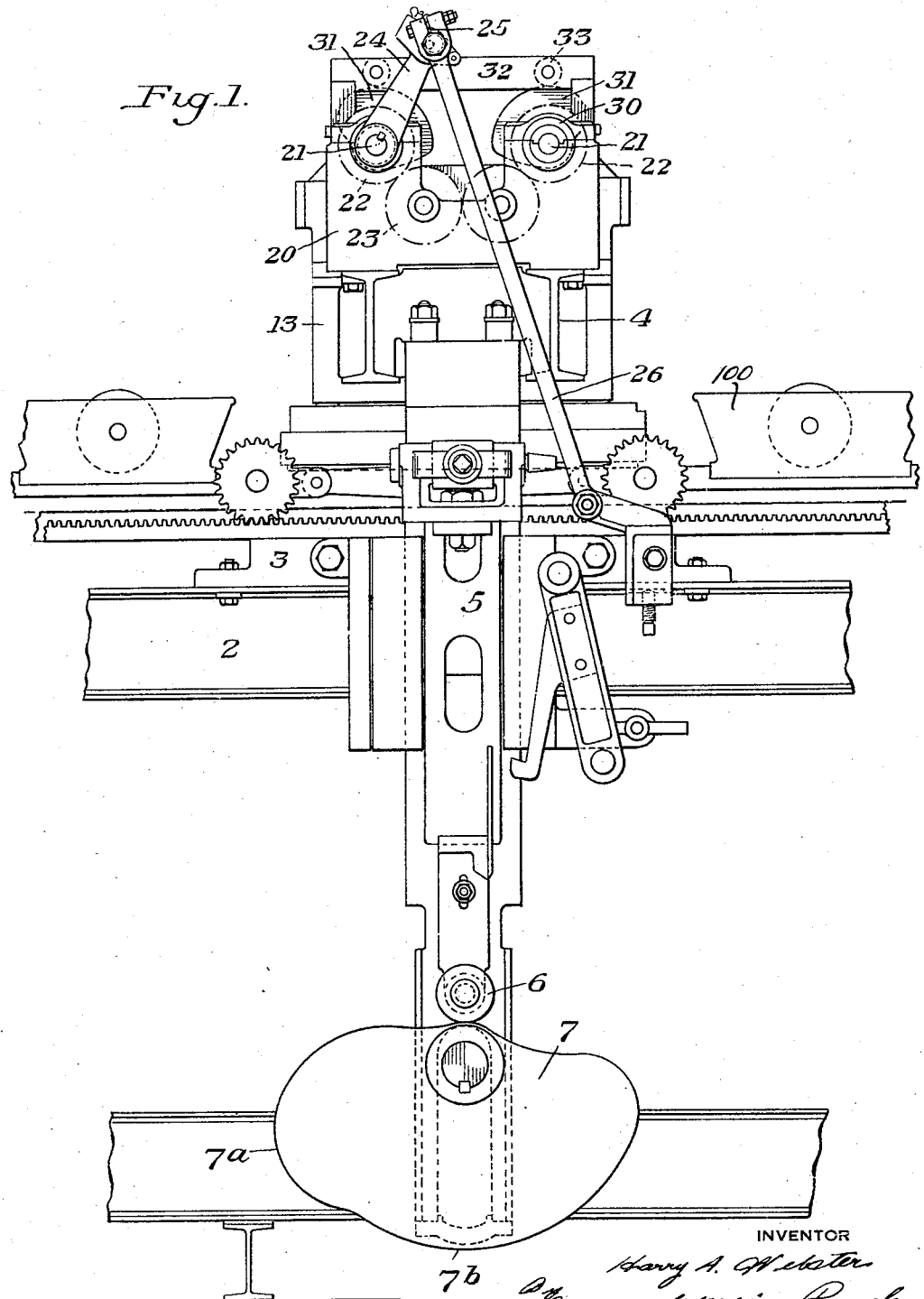
Figure 1 is a side elevation of a single printing head unit of a block printing machine embodying my invention.

In the drawings, 2 designates the frame of a block printing machine having a bed 3 along which the linoleum or other material to be printed upon is intermittently moved in accordance with the usual operation of such machines. Arranged along the bed of the machine are printing heads with operating mechanisms. One of these printing head units is shown in Figure 1. The general construction and arrangement is similar to that now commonly employed and shown in Patent No. 1,263,900 to Jones and Webster, dated April 23, 1918.

The printing head has a frame 4 supported at each end on a vertically reciprocable post 5. On the lower end of the post 5 is a cam follower 6 which engages an operating cam 7.

As the cam 7 rotates, the frame 4 is lifted and then dropped down, one rotation of the cam effecting one cycle of operation of the printing head. As heretofore constructed, the frame of the printing head has ordinarily carried a printing block. In accordance with the present invention, which as previously pointed out constitutes an improvement of my former application and the application of William Penn Brinton, the printing block is divided either longitudinally or transversely, or both ways. In the drawings I have shown the printing block as being divided transversely into a plurality of individual sections. These printing block sections are designated 8, 9 and 10. There may be any practicable number of these individual blocks. Each of the blocks is secured to the under side of a pad 11. The pad 11 is suspended from rods 12 slidably carried in frame 13 attached to the frame work 4 of the head. In the particular construction shown there are four posts or rods 12 on each block 8. On the upper end of each of the posts 12 is a bolt 14 (see Figure 14), which is threaded into the top of the post. A lock nut 15 serves to hold the bolt 14 in the proper position. On the upper part of the bolt is a block 16. The block 16 is confined against relative movement by the head 14$^a$ of the bolt and a nut 17. The block 16 is countersunk to receive the head 14$^a$ of the bolt, and has a groove 18 across the top thereof. This is best shown in Figure 16. On the inner face of the block 16 is a vertically extending rib 19.

At each end of the printing head is a bearing plate 20. Mounted in bearings on this plate are shafts 21 which extend across the width of the machine. There are two of these shafts which are parallel. Gears 22 and 23 serve to connect the shafts so that one may be driven upon rotation of the other.

Figure 2:
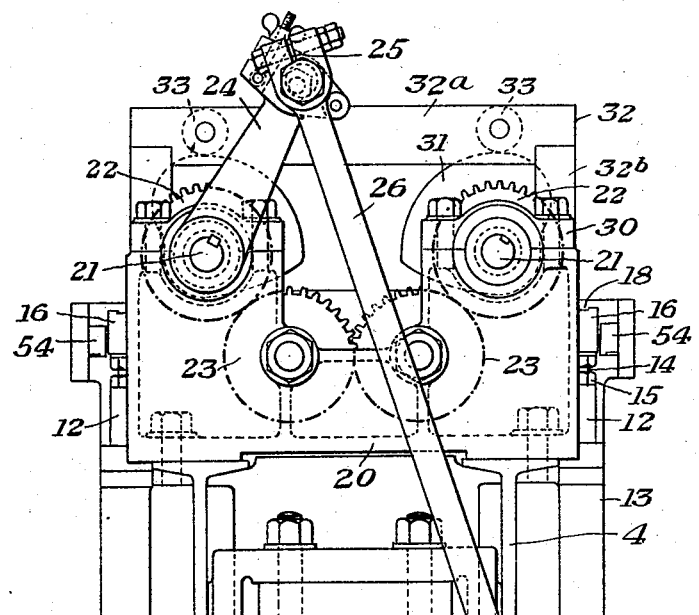
Figure 2 is a similar view on a slightly larger scale of the upper part only of this unit.
Figure 3:
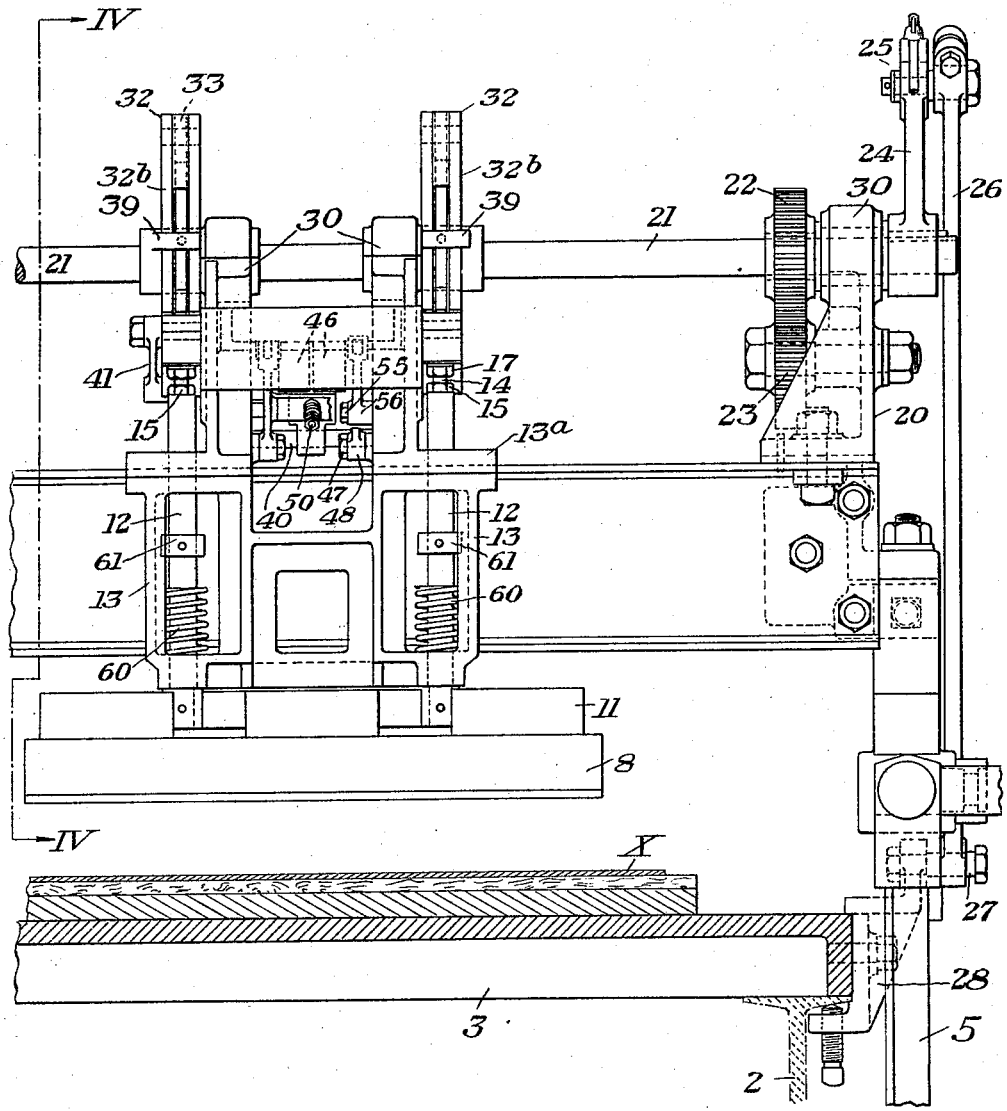
Figure 3 is a front elevation of one end of the printing head unit, only so much of the machine as pertains to the present invention being shown.

Either or both of the shafts 21 may have an extension at one end of the head to which is keyed a crank arm 24. (See Figures 1, 2 and 3.) The outer end of the crank arm is connected through an adjustable connection 25 with the upper end of a link 26. The lower end of the link 26 is pivotally secured at 27 to a bracket 28 firmly secured to the bed of the machine.

The arrangement is such that as the head moves up and down, above the bed of the machine, the crank 24 will be oscillated to rotate the shafts 21 through an arc. This arc is calculated to be about 90°.

The frame 4 of the printing head carries a frame structure 13 previously described for each of the individual printing blocks of the head. Each frame structure 13 projects above the top of the head and is provided with spaced apart bearings 30 for the shafts 21. On each of the shafts 21 are cams 31 which are spaced along the shafts at suitable intervals. The shafts 21 are geared to rotate in opposite directions, and the cams 31 on one shaft are just reversed to those on the other. This is clearly shown in Figures 4 and 5.

Each of the individual block sections 8 is, in the construction shown, suspended from four rods 12. There are, accordingly, four cams 31 over each of the block sections 8. Two of these are on one of the shafts 21 and two are on the other.

Figure 7:
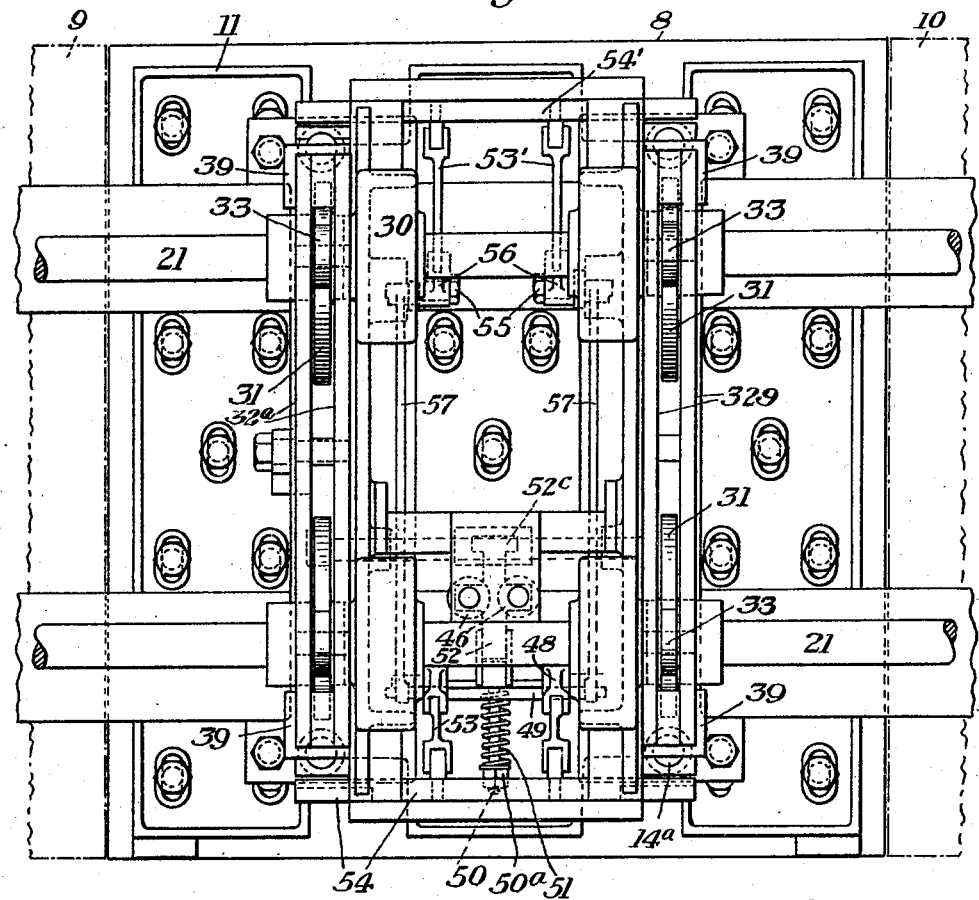
Figure 7 is a top plan view of that portion of the mechanism shown in Figure 6.
Figure 8:
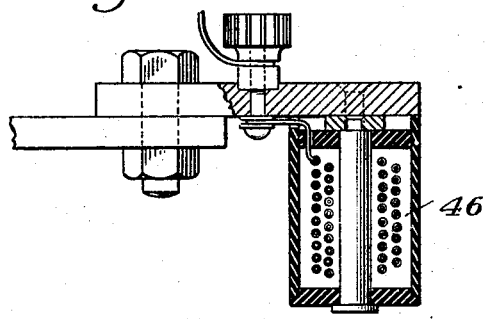
Figures 8 and 9 are detail views showing transverse and longitudinal sections of the electromagnet for operating the latch.
Figure 9:
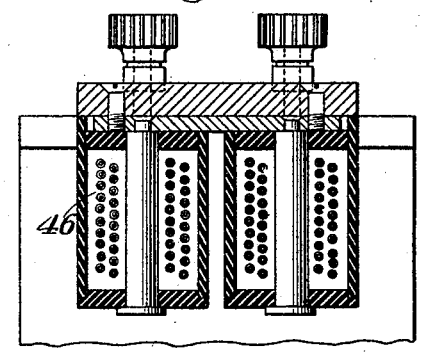

Cooperating with the cams 31 for each sectional block is a vertically reciprocable yoke 32. This yoke includes cross pieces 32$^a$, depending bifurcated legs 32$^b$, and bottom cross pieces 32$^c$. The top pieces 32$^a$ are formed of parallel bars, as best shown in Figure 7. Between the bars forming the top cross pieces 32$^a$ are cam followers or rollers 33. The bottom cross pieces 32$^c$ are of similar construction and they carry cam followers or rollers 34. The yoke therefore has one roller 33 and one roller 34 for each of the four cams 31. When the cams 31 rotate in the direction of the arrows shown in Figure 4, the yoke 32 is moved down relatively to the frame 4 of the vertically reciprocable head, and when the cams 31 rotate in the reverse direction, the yoke 32 is lifted or raised with respect to the frame 4.

Since the cams 31 rotate through the complete arc of their movement and back to starting position with each downward movement of the head 4, and since it is desirable to selectively operate the printing block sections 8, a latch mechanism is provided for connecting and disconnecting each block section 8 with its operating yoke 32. The construction of the latch in the arrangement hereinafter described is such that when the latch is in active position the block 8 will move up and down with the yoke, but when the latch is released the block member 8 can be held in its lowermost position while the yoke 32 operates independently thereof.

Carried in each of the four vertical legs 32$^b$ is a pivoted latch 35 having a bottom lug 35$^a$ adapted to normally project under the rib 19 on the block 16. This arrangement is most clearly shown in Figures 14 and 15. The latch is pivotally supported at 36 and has an upwardly extending tail 37. The compression spring 38 confined between the tail and a block 39 on the leg 32$^b$ serves to hold the latch member 35 in the position shown in Figure 14, and to urge it to such position when it is moved to the released position shown in Figure 5. The latch is shown in detail in Figure 17.

As shown in Figures 14 and 15 the portions 32$^d$ of the yokes 32 overhang the blocks 16 of the respective posts 12. When the cam rotates in the direction of the arrow shown in Figure 14, portion 32$^d$ presses down on the block 16 forcing the rod 12 to slide down with respect to the head frame 4. In Figure 6 the block sections 9 and 10, indicated in broken lines, show the downward limit of movement of the blocks while the full line position of the block section 8 shows the upward limit of movement of the blocks. When the cam 31 is rocked in the direction of the arrow in Figure 15, the lug 35$^a$ of each latch hooks under the block 16 of the corresponding post 12 to lift the printing block section attached thereto.

In the operation of the machine it is desirable that each block section 8 shall move down upon the upward movement of the head frame 4. Any block section which is to print on the next succeeding dip of the head must be positively locked down when the head reaches the upward limit of its movement. Any blocks which are not going to print on the next succeeding dip of the head must be lifted upwardly with respect to the head frame 4 when the head again moves down to print.

It is desirable that only those blocks with which it is desired to print shall receive paint from the paint applying mechanism of the machine, while the blocks which are not to print will be held out of paint receiving position. The blocks which are to print on the next succeeding dip of the machine must be disconnected from their operating yokes, while the blocks which are to be lifted out of printing position will remain connected with the operating yokes.

Figure 4:
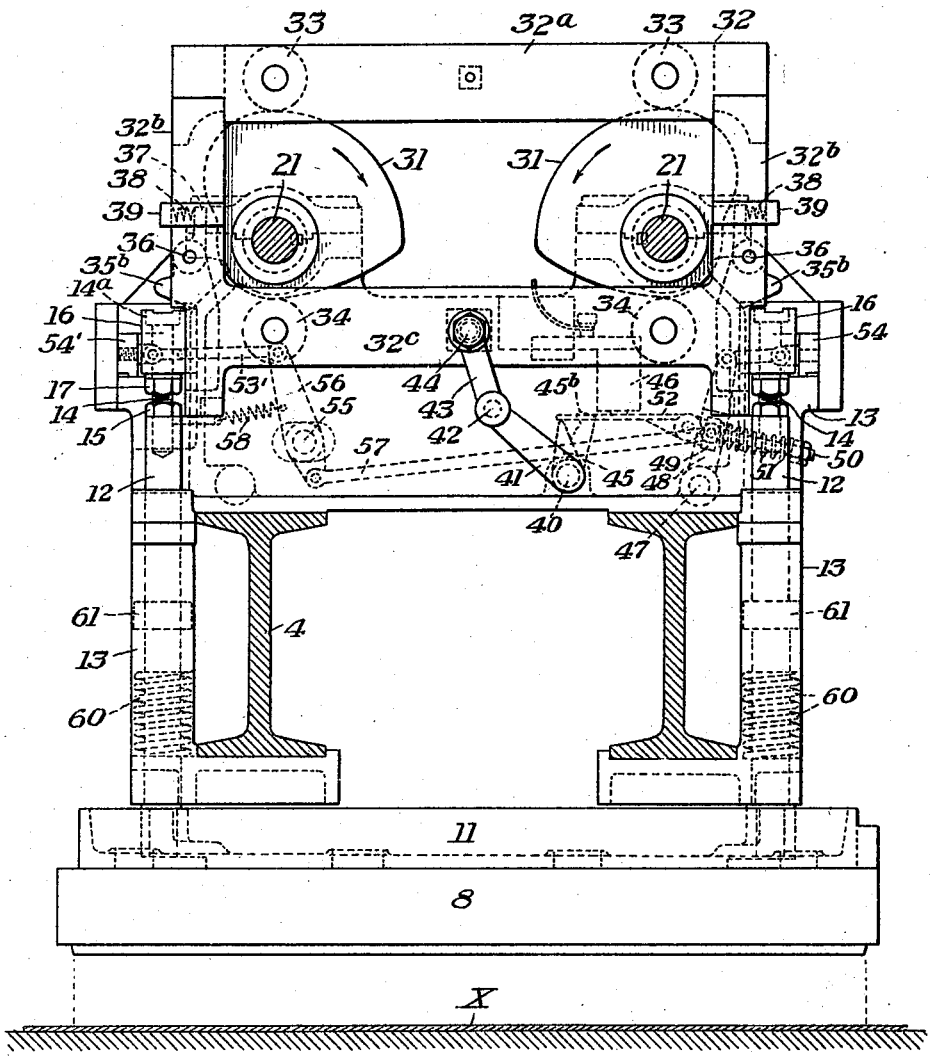
Figure 4 is a transverse section in the plane of line IV—IV of Figure 3, the view showing the parts in the position which they assume when the printing head itself is in its lowermost position, but the individual printing block is in its uppermost position.
Figure 5:
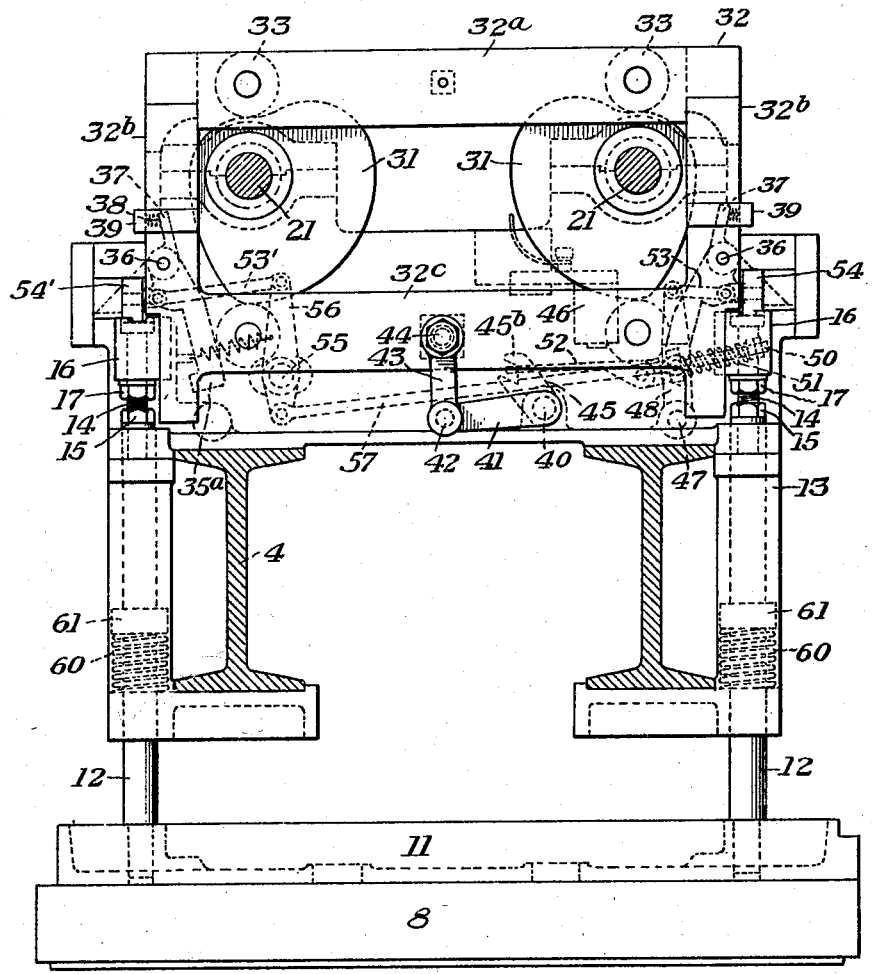
Figure 5 is a similar view showing the position which the parts assume with the printing head itself at the uppermost limit of its movement and the individual block projected down to operable position.

Mounted on a portion of the frame 13 carried on the head frame 4 is a rock-shaft 40 (see Figures 4, 5 and 10). The rock-shaft has a link 41 on one end thereof which is pivotally connected at 42 with a link 43 pivotally secured at 44 to a part 32$^c$ of the vertically reciprocable yoke. When the yoke 32 moves from its upper position (shown in Figure 4) to its lower position (shown in Figure 5), the shaft 40 is rotated through a slight arc by means of the links 41 and 43 in a counter-clockwise direction as viewed in Figure 4. Secured to the shaft 40 is a dog 45 of the peculiar construction shown in Figure 12. This dog has upright portions 45ª at the upper ends of which are lugs 45ᵇ. These lugs have hook portions 45ᶜ. The lugs are spaced apart. The dog 45 also has an inclined extension 45ᵈ located to the left of the upright portions 45ª. The top of the inclined extension 45ᵈ is preferably in the same plane as the hook portions 45ᶜ of the lugs 45ᵇ. This arrangement is best shown in Figure 10.

Carried on a portion of the frame 13 is an electromagnet 46, the poles of which are inverted. Carried on the frame work 13 parallel in both planes to the shaft 40 are studs 47 on which are upright levers 48. The parallel arms 48 support a cross bar 49 (shown in detail in Figure 13), which cross bar has trunnions 49ª at each end thereof. The cross bar 49 has a central opening 49ᵇ therein. Passing through the opening 49ᵇ is an eye-bolt 50, the eye of which is directed toward the left as viewed in Figure 10. On one end of the eye-bolt 50 are nuts 50ª and a relatively heavy compression spring 51 is confined about the shank of the eye-bolt between the nuts 50ª and the cross piece 49. The bar 49 has reduced non-circular portions 49ᶜ which fit into corresponding openings in the arms 48.

Pivotally secured to the eye 50ᵇ is a link 52 (see Figure 11) of soft iron. The link 52 is the armature for cooperation with the magnet 46. It has lateral extensions 52ª adapted to extend under the pole pieces of the magnet. Projecting forwardly to the left from the extensions 52ª is an extension 52ᵇ having a cross head 52ᶜ thereon, the part 52ᵇ—52ᶜ being T-shaped. This T-shaped extension projects between the upright portions 45ª of the dog 45, and the cross piece 52ᶜ is adapted to slide up and down the incline 45ᵈ and be engaged by the hooks 45ᶜ as hereinafter more fully described.

Connected to the upper end of the lever arm 48 are horizontal links 53. These links 53 are connected to a latch bar 54 which is slidably supported in portions 13ª of the frame work 13. On the under side of the latch bar 54 adjacent each end is a downwardly projecting portion 54ª adapted to cooperate with the groove 18 in the tops of the blocks 16.

Figure 18:
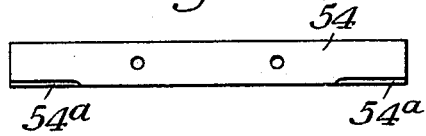
Figure 18 is a front elevation of one of the latch or hold-down bars forming a part of the mechanism.

Pivotally supported in the frame 13 parallel with the shaft 40 is another pair of studs 55 having parallel lever arms 56 thereon. The lower ends of the lever arms 56 are connected by means of parallel links 57 with the trunnions 49ª of the cross piece 49 that extends between the lever arm 48. The lever arms 56 have their upper ends connected to a horizontal link 53′. The horizontal links 53′ are pivotally connected to a latch bar 54′ similar in construction, arrangement and function to the latch bar 54. The arrangement is such that when the arm 48 is rocked to the left from the position shown in Figure 10 to move the latch bar 54 to the left the lever arms 56 will be rocked to the right to draw the latch 54′ to the right. In Figure 18 there is shown a front elevation of the latch bar 54. The latch bar 54′ is of similar construction.

The operation of one section 8 of the printing block can now be traced with a single cycle in the operation of the printing head as a whole. Starting with Figure 4, the printing head frame 4 is in its lowermost position. The block 8 has not printed and consequently is above the printing position, and above the surface of the linoleum or other floor covering material X. As the head frame 4 starts to rise through the rotation of the operating cam 7, the cams 31 are rocked in the direction of the arrows shown in Figure 4. This rocking movement is effected by reason of the link 26 having one end connected to the stationary frame of the machine and the other end connected to the lever 24 of the shaft 21. As the head frame 4 continues to move up the cams 31 acting against the lower cam followers 31 depress the yoke 32. Thus, while the head as a whole is being lifted, the yoke which is on the head is moving downwardly with relation to the head frame, however, of course, being carried by the head frame. When the head frame 4 reaches the uppermost limit of its movement shown in Figure 5, the cams 31 have been rotated to the position shown. The yoke 32 is then at the lowermost limit of its movement with respect to the head frame 4. The yoke 32 in moving downwardly has forced the block 8 downwardly by reason of the shoulders 32ᵈ of the yokes 32 remaining against the tops of the blocks 16.

When the parts are in the position shown in Figure 4, the cross piece 52ᶜ of the armature 52 is resting on the top of the inclined part 45ᵈ of the dog 45 on the shaft 40. As the yoke 32 starts to move down, the dog 45 is rocked to the left. If the magnet 46 is energized, the armature 52 will be held up, and the hooks 45ᶜ will engage the portions 52ᶜ. As the yoke 32 continues to move down with the portions 52ᶜ engaged by the hooks 45ᶜ of the dog 45, the armature 52 is pulled to the left, pulling the eye-bolt 50 to the left and compressing the spring 51.

When the block 8 has been completely depressed to the position shown in Figure 5, at which time the blocks 16 are in a plane below the latch bars 54 and 54′, the spring 51 acting against the cross bar 49 will rock the levers 48 to move the latch bar 54 over the top of two of the blocks 16 at one side of the printing head. At the same time, the latch bar 54′ will be moved to the right, as viewed in Figure 10, through the link connection described over the tops of the two other blocks 16 at the other side of the machine. In moving to a position over the tops of the blocks 16, the bars 54 contact with lugs 35ᵇ on the latch members 35, swinging the latch members inwardly until the bottom lugs or hooks 35ª clear the bottoms of the blocks 16, as shown in Figure 5, this being effected against the compression of the springs 38.

After the latch bars have moved in toward each other over the top of the blocks 16, the parts are in the position shown in Figure 5. It will be recalled that this lowering movement of the block 8, to the position shown in Figure 5, occurs while the head as a whole is moving up. At the time the head reaches its uppermost position the block 8, if it is to print, is held depressed by the bars 54, as shown in Figure 5. In lowering from the uppermost position to printing position, it drops a slight distance and then dwells for a sufficient period of time to permit the passage of the paint carriage 100 thereunder. After the passage of the paint carriage the head continues its downward movement. The length of dwell and the point at which the dwell in the drop of the head occurs are, of course, determined by the shape of the operating cam 7, as is common in machines of this type.

Beginning now with the head in its uppermost position, as shown in Figure 5, with the block 8 depressed to its operative position, the head frame 4 starts to lower. Immediately, the cams 31 begin to rotate in the direction of the arrow shown in Figure 15. The first effect of reversing the movement of the cams 31 is to ease the shoulders 32ᵈ of the yoke 32 off the block 16 at which movement springs 60 have sufficient lifting force to raise the block 8, pads 11 and plungers 12, to bring the blocks 16 tightly under the bar 54, so that the shoulder 54ª locks inside of the groove 18 of the block 16. Then, as the head continues to drop, the cams 31 lift the yoke 32, but due to the fact that the latches 35 are unhooked from under the ribs 19 on the blocks 16, the yoke is free to lift relatively to the head 4 while the block 8 is held down by the bars 54. By the time the head has dropped to the paint receiving position the yoke 32 will have lifted relatively to the blocks 16. After receiving color, the head 4 continues to drop with the block 8 depressed. It moves down to printing position and after making the impression on the goods is again lifted.

When the cam 7 rotates to drop the head from the high point 7ª to the inking dwell 7ᵇ the cams 31 rotate sufficiently to pull the other non-printing sections of the block up far enough above the printing section to give clearance to the paint fountain so that paint will not be applied to the non-printing sections. A more generous clearance for the non-printing sections is secured at the moment of printing by the further rotation of cams 31 during the further downward movement of the head.

During the downward movement of the head 4, the upper movement of the yoke relatively to the head 4 has rotated the shaft 40 to the right from the position shown in Figure 5 to the position shown in Figure 4. If the magnet 46 is energized when the head starts to lift after the block 8 has printed, the cycle of operation just described will be repeated. If the block 8 is not to print on the next succeeding dip of the head, the magnet 46 will not be energized. If the magnet 46 is not energized, the portion 52ᶜ of the armature link 52 instead of being held up in the path of the hooks 45ᶜ of the dog 45 will ride down the incline 45ᵈ of the dog 45. Therefore, when the dog rocks to the left the link 52 will not be pulled to the left and the spring 50 will not be put under compression. As the head approaches the upper limit of its movement the yoke 32 will approach the lowermost limit of its movement. The shoulder 32ᵈ of the yoke 32 will come into contact with the top of the block 16, when the head has almost reached the uppermost limit of its movement. Up to this time the latch 35 will still be in released position and the bars 54 and 54' will still be in operative position over the blocks 16. The cams 31 are so shaped that just before the head reaches the uppermost limit of its movement the yoke will be driven down just enough to push the blocks 16 downwardly a depth only slightly greater than the grooves 18 in the top of these blocks. At the instant the blocks are so depressed, the tension springs 58 attached to the lever arms 56 will draw the lever arms 56 to the left as shown in Figure 10, forcing the latch bars 54 and 54' away from the position over the blocks 16. When the head reaches the uppermost position the cams 31 will have depressed the yokes 32 and latches 35 to permit the springs 38 to swing the latches 35 back into operative position. The depression or the block 16 below the position shown in Figure 15 an amount only slightly greater than the grooves 18 occurs only for an instant just before the head reaches the uppermost position and only for the purpose of letting the ribs 54ª of the bars 54 clear the tops of the blocks 16.

When the head dips down on its next printing cycle the lugs 35ª on the latches 35 will be under the ribs 19 of the respective blocks 16. Since the yoke 32 moves up with respect to the head as the head itself moves down, the block section 8 will be lifted above the plane of the other blocks on the head which are to print. The lifting occurs practically as soon as the head starts down so that by the time the head has lowered to paint receiving position the blocks which are not to print will be in a plane above the block or blocks which are to print, and will, therefore, receive no paint from the paint carriage.

When the head is down in printing position the blocks which are not to print will be in their uppermost position with respect to the printing head frame 4. This is clearly shown in Figure 4 where the head is down to its lowermost or printing position while the block 8 is elevated well above the goods X.

If, instead of the magnet 46 having been energized when the head started to lift, it had not been energized, the springs 51 would not have been placed under compression again and at the instant when the blocks 16 were momentarily depressed in the manner just stated, springs 58 would draw and hold the bars 54 and 54′ into inoperative position with respect to the blocks 16.

I have described in detail the operation of one printing block unit on the printing head. If the head is divided into eight printing block sections, then there are eight of these units and each is independently controlled by its own electromagnet 46. The energization of the magnets 46 takes place only for a moment. By proper control of the magnets 46 any desired combination in the operation of the separate block sections can be secured. For instance, on one dip of the head a single one of the printing block sections may print while all the rest of them are held out of printing position. On the next dip of the head another one of the block sections may print. Two or more sections may print at the same time, or all of the sections can be held out of printing position. In my copending application, Ser. No. 388,584, filed August 26, 1929, I have described an electrical contact mechanism for automatically controlling the selection and sequence for the energization of the magnets 46.

It will be observed that there are compression springs 60 around the posts 12. Each spring is confined between a portion of the frame 13 and a collar 61 on the post. When a block, such as the block 8, is depressed to its operative position, as shown in Figure 5, the springs 60 are compressed. The function of these springs is to urge the posts 12 upwardly to hold the blocks 16 tight against the hold-down or latch bars 54 and 54′. The springs 60 are not compressed until near the end of the upward movement of the head, and then only to a slight extent. This reduces the amount of energy required to operate the head as compared with the energy required to operate a head as disclosed in my said earlier application. The bars 54 and 54′ can not become disengaged from their operative position except at the time when the blocks are momentarily depressed for the purpose of permitting the bars to release. This arrangement also permits the blocks to be accurately set to the printing position.

From the foregoing it will be seen that the invention contemplates a printing head having a sectional printing block with an operating unit for each section, comprising an operating yoke or frame, a latch or other mechanism by means of which the yoke or operating means may be connected or disconnected from the printing block section, and a hold-down for maintaining any printing block section in printing or operative position when that block or section is disconnected from its operating means or yoke. The entire arrangement is made flexible by reason of the use of electromagnets for controlling the operation of each individual block section separately. Any one of the printing block sections on a given printing head can be operated with the same degree of activity that is possible in controlling the up and down movement of the heads in a machine of the type disclosed in the said Jones and Webster patent. In other words, it becomes possible not only to selectively control the movement of an entire head, but also the movement of the individual printing block sections on that head without reference to the movement of the other sections on the same head.

It will be seen that in the arrangement shown in the present invention the cams 31 will be operated with each dip of the machine and that the set of cams for each block section are all alike and are moved to the same extent. Notwithstanding this, the operation of each individual block section is independently controlled.

While I have described one specific embodiment of my invention, it will be understood that the invention is not confined to the particular construction shown.

I claim as my invention:

1. In a block printing machine, a printing head having a plurality of separate block sections each of which is relatively movable into a printing or a non-printing position, a common operating means for all the sections, and an individual mechanism for each section for selectively holding it in one of said positions.

2. In a block printing machine, a reciprocable printing head, means for effecting reciprocation of the printing head, said head having a plurality of separate block sections each of which is relatively movable into a printing and a non-printing position, a common operating means for all the sections synchronized with the movement of the head, and an individual mechanism for each section for selectively holding it in one of said positions.

3. In a block printing machine, a printing head having a plurality of separate block sections each of which is relatively movable into a printing and a non-printing position, a common operating means for all the sections and a mechanism for selectively connecting any section with the common operating means.

4. In a block printing machine, a printing head having a plurality of separate block sections each of which is relatively movable into a printing and a non-printing position, a common operating means for all the sections and a mechanism for selectively connecting any section with the common operating means, said mechanism including a latch.

5. In a block printing machine, a printing head having a plurality of separate block sections each of which is relatively movable into a printing and a non-printing position, a common operating means for all the sections, and a mechanism for selectively connecting any section with the common operating means, said mechanism including a latch and an electromagnet through which the latch is operated.

6. In a block printing machine, a printing head having a plurality of separate block sections each of which is relatively movable into a printing and a non-printing position, a common operating means for all the sections, and a mechanism for selectively connecting any section with the common operating means, said mechanism including a latch, and a separate hold-out means for each section for confining it against relative vertical movement.

7. In a block printing machine, a printing head having a plurality of separate block sections each of which is relatively movable into a printing and a non-printing position, a common operating means for all the sections, a mechanism for selectively connecting any section with the common operating means, said mechanism including a latch and a separate hold-out means for each section for confining it against relative vertical movement, and an electromagnet with which the operation of the latch and the bar are controlled.

8. In a block printing machine, a reciprocable printing head, means for raising and lowering the printing head, said head having a plurality of separate printing block sections each of which is relatively movable into a printing and a non-printing position, and operating means actuated through the reciprocation of said head for simultaneously operating all of the block sections, and a mechanism for selectively connecting or disconnecting each section with the operating means.

9. In a block printing machine, a reciprocable printing head, means for raising and lowering the head, a plurality of separate printing block sections on the head relatively movable thereon into a printing and a non-printing position, a common operating means for all of the sections and operated by the up and down movement of said head, and an individual mechanism for each printing block section for selectively holding it in one of said positions independently of the movement of the other printing block sections.

10. In a block printing machine, a reciprocable printing head, means for raising and lowering the head, a plurality of separate printing block sections on the head relatively movable thereon into a printing and a non-printing position, a common operating means for all of the sections and operated by the up and down movement of said head, and an individual mechanism for each printing block section for selectively holding it in one of said positions independently of the movement of the other printing block sections, said mechanism including an electromagnet.

11. In a block printing machine, a printing head having a plurality of block sections each of which is relatively movable into a printing and a non-printing position, operating means for effecting the movement of the printing block sections into and out of printing position, and an electromagnet associated with each printing block section for selectively controlling its movement.

12. In a block printing machine, a reciprocable printing head having a plurality of separate block sections each of which is relatively movable thereon into a printing and a non-printing position, a common operating means for all the sections, and a mechanism for each section for selectively disconnecting it from the operating means when the block sections are in printing position, and means for locking the section in printing position when it has been disconnected from the operating means.

13. In a block printing machine, a printing head, a printing block section on the head, movable relatively to the head into a printing and a non-printing position, a mechanism for forcing the block down to printing position and for raising it to non-printing position, and selectively operable means for holding the block depressed in the printing position.

14. In a block printing machine, a reciprocable printing head having a printing block section thereon, and means including a rotating cam for positively raising and lowering the printing block section relatively to the head.

15. In a block printing machine, a printing head having a plurality of separate printing block sections thereon, means including a series of cams for simultaneously depressing or lifting all of said printing block sections, and means for selectively holding any section in the depressed position.

16. In a block printing machine, a machine frame, a printing head movable up and down with respect to the frame, a cam shaft on the printing head, means for connecting the cam shaft with the frame to impart a rotative movement to the shaft upon reciprocation of the head, a printing block section on the head movable up and down thereon with respect to the head, a cam on said shaft, and a yoke engaging the cam and connected with the printing block section whereby the printing block section may be moved up and down with respect to the head when the head is reciprocated.

17. In a block printing machine, a machine frame, a printing head movable up and down with respect to the frame, a cam shaft on the printing head, means for connecting the cam shaft with the frame to impart a rotative movement to the shaft upon reciprocation of the head, a printing block section on the head movable up and down thereon with respect to the head, a cam on said shaft, a yoke engaging the cam and connected with the printing block section whereby the printing block section may be moved up and down with respect to the head when the head is reciprocated, and means for selectively connecting and disconnecting the printing block section with the yoke.

18. In a block printing machine, a machine frame, a printing head movable up and down with respect to the frame, a cam shaft on the printing head, means for connecting the cam shaft with the frame to impart a rotative movement to the shaft upon reciprocation of the head, a printing block section on the head movable up and down thereon with respect to the head, a cam on said shaft, a yoke engaging the cam and connected with the printing block section whereby the printing block section may be moved up and down with respect to the head when the head is reciprocated, means for selectively connecting and disconnecting the printing block section with the yoke, and other means for holding the block depressed when it is disconnected from the yoke.

19. In a block printing machine, a machine frame, a printing head movable up and down with respect to the frame, a cam shaft on the printing head, means for connecting the cam shaft with the frame to impart a rotative movement to the shaft upon reciprocation of the head, a printing block section on the head movable up and down thereon with respect to the head, a cam on said shaft, a yoke engaging the cam and connected with the printing block section whereby the printing block section may be moved up and down with respect to the head when the head is reciprocated, means for selectively connecting and disconnecting the printing block section with the yoke, other means for holding the block depressed when it is disconnected from the yoke, and an electromagnet through which the operation of both of the said last named means is effected.

20. In a block printing machine, a vertically reciprocable head movable up and down into and out of printing position, a printing block section on the head movable relatively to the head up and down out of printing position, operating means for moving the block section down when the head moves up and for moving the block section up when the head moves down, and means for selectively connecting the printing block section with the operating means.

21. In a block printing machine, a reciprocable printing head movable up and down into and out of printing position, a plurality of seperate block sections on the head each of which is relatively movable thereon into and out of printing position, a yoke member for operating each block section, means for raising and lowering all of said yoke members in unison, and latches through which the block sections are connected with the yokes.

22. In a block printing machine, a reciprocable printing head movable up and down into and out of printing position, a plurality of separate block sections on the head each of which is relatively movable thereon into and out of printing position, a yoke member for operating each block section, means for raising and lowering all of said yoke members in unison, and latches through which the block sections are connected with the yokes, said operating means moving the block sections down when the head moves up and vice versa.

23. In a block printing machine, a reciprocable printing head movable up and down into and out of printing position, a plurality of separate block sections on the head each of which is relatively movable thereon into and out of printing position, a yoke member for operating each block section, means for raising and lowering all of said yoke members in unison, latches through which the block sections are connected with the yokes, and electromagnets through which the operation of said latches is controlled.

24. In a block printing machine, a printing head, a printing block section on the head movable up and down relatively thereto, a yoke for operating the block section up and down with respect to the head, means for operating the yoke, a latch connecting the yoke with the block section, a movable hold-down member for holding the block section down when said latch is inoperative, means operated by the movement of the yoke relatively to the head for moving the hold-down member into operative position, and an electromagnet for controlling the operation of said last named means.

25. In a block printing machine, a printing head, means for reciprocating the head vertically, a printing block section on the head movable vertically on the head into and out of printing position, a yoke reciprocable on the head for effecting the up and down movement of the printing block section, means for operating the yoke, and a latch mechanism for releasably connecting the yoke with the printing block section.

26. In a block printing machine, a printing head, means for reciprocating the head vertically, a printing block section on the head movable vertically on the head into and out of printing position, a yoke reciprocable on the head for effecting the up and down movement of the printing block section, means for operating the yoke, and a movable bar for holding the printing block section in printing position, selectively operable means for effecting movement of the bar, and a latch for releasably connecting the yoke with the head and adapted to be released when the bar is in position for holding the block section down in printing position.

27. In a block printing machine, a printing head, means for reciprocating the head vertically, a printing block section on the head movable vertically on the head into and out of printing position, a yoke reciprocable on the head for effecting the up and down movement of the printing block section, means for operating the yoke, a movable hold-down bar for holding the printing block section down in printing position and operable from a released position to a hold-down position, a latch operated through the movement of the hold-down bar for disconnecting the yoke and the printing block section when the hold-down bar is in holding-down position, and means for selectively operating the hold-down bar.

28. In a printing head for block printing machines having a printing block section movable up and down thereon and a yoke movable up and down thereon with means for releasably connecting the yoke with the printing block section, a hold-down mechanism for the printing block section including a bar movable into and out of hold-down position, a dog on the head operatively connected with the yoke whereby it is moved by the movement of the yoke relatively to the head, a trip link movable into and out of engagement with the dog, an electromagnet for controlling the operation of the trip link, and a yieldable connection between the trip link and the bar.

29. A multiple-block printing head for block printing machines wherein there is a plurality of individually movable blocks and an operating yoke for each block with a common operating means for all of the yokes with a latch for connecting the yokes with their respective blocks characterized by the provision of a hold-down mechanism for each printing block section for holding each section against movement of the operating yoke, said hold-down mechanism including a hold-down bar movable into and out of operative position, means operated by the movement of the yoke for effecting the movement of the hold-down bar, and an electromagnet for rendering said last-named means operative.

30. A multiple-block printing head for block printing machines wherein there is a plurality of individually movable blocks and an operating yoke for each block with a common operating means for all of the yokes with a latch for connecting the yokes with their respective blocks characterized by the provision of a hold-down mechanism for each block section which mechanism is adapted to release the latch connecting the yoke with the printing block section when the printing block section is depressed and hold the printing block section against upward movement, means for operating the hold-down mechanism, and an electromagnetic control for each hold-down mechanism.

31. A printing head for block printing machines having a plurality of individually movable printing block sections with a separate operating yoke for each section, and means for simultaneously operating all of said yokes characterized by the provision of means for selectively disconnecting any section from its operating yoke and holding such section in a predetermined position independently of the motion of the yoke or other block sections on the same head.

32. A printing head as set forth in claim 31 wherein the connection between the sectional printing blocks and their operating yokes is restored upon further predetermined operation of the head.

33. A printing head for block printing machines, having a plurality of individually movable printing block sections with a separate operating yoke for each section, and means for simultaneously operating all of said yokes characterized by the provision of means including an electromagnet for selectively disconnecting any section from its operating yoke and holding such section in a predetermined position independently of the motion of the yoke or other block sections on the same head.

34. In a block printing machine, a reciprocable printing head and means for reciprocating the same, a plurality of separate block sections each of which is relatively movable vertically into and out of printing position, an operating yoke releasably connected with each printing block section for effecting the movement thereof, a common operating means for all of said yokes operated by the reciprocation of the head, said means being adapted to raise the block sections out of printing position on the downward movement of the head and lower the block sections to printing position upon upward movement of the head, and selectively operable means for simultaneously disconnecting any yoke with its printing block section and holding said section in a predetermined position.

35. In a block printing machine, a reciprocable printing head and means for reciprocating the same, a plurality of separate block sections each of which is relatively movable vertically into and out of printing position, an operating yoke releasably connected with each printing block section for effecting the movement thereof, a common operating means for all of said yokes operated by the reciprocation of the head, said means being adapted to raise the block sections out of printing position on the downward movement of the head and lower the block sections to printing position upon upward movement of the head, and selectively operable means for simultaneously disconnecting any yoke with its printing block section and holding said section in a predetermined position, said means including at least one hold-down bar and a spring for urging the printing block section upwardly against the hold-down means when such section is disconnected from its operating yoke.

36. In a block printing machine, a reciprocable printing head having a plurality of movable printing block sections thereon, means for reciprocating the head, means for simultaneously lifting and lowering all of the printing block sections in unison, and means for selectively releasing any section from the operating means and holding it in a predetermined position.

37. In a block printing machine, a reciprocable printing head having a plurality of movable printing block sections thereon, means for reciprocating the head, means for simultaneously lifting and lowering all of the printing block sections in unison, and electromagnetically controlled means for selectively releasing any section from the operating means and holding it in a predetermined position.

38. In a block printing machine, a vertically reciprocable printing head, a plurality of printing block sections on the head movable vertically relatively thereto, means for lifting the block sections relatively to the head as the head moves down and lowering them as the head moves up.

39. In a block printing machine, a vertically reciprocable printing head, a plurality of printing block sections on the head movable vertically relatively thereto, means for lifting the block sections relatively to the head as the head moves down and lowering them as the head moves up, and selectively operable means for holding any section against upward movement when the head moves down.

40. In a block printing machine, a vertically reciprocable head, an operating cam therefor having a high point, a low point and an inking dwell, a series of vertically movable blocks on the head, means for lowering the blocks relatively to the head when the head raises to its high point, means for lifting the blocks relatively to the head when the head moves from the high to the low point, said means operating to partially lift the blocks at the inking dwell, selectively operable means for holding any block against relative lifting with the downward movement of the head, and a paint carriage movable under the head during the inking dwell.

41. In a block printing machine, a vertically reciprocable head, an operating cam therefor having a high point, a low point and an inking dwell, a series of vertically movable blocks on the head, means for lowering the blocks relatively to the head when the head raises to its high point, means for lifting the blocks relatively to the head when the head moves from the high to the low point, said means operating to partially lift the blocks at the inking dwell, selectively operable means for holding any block against relative lifting with the downward movement of the head, said means including a hold element for each block movable into and out of operating position, and springs adapted to be compressed during the final portion of the downward movement only of the blocks relatively to the head for urging the blocks upwardly against the hold down means when the hold down means are in operative position.

In testimony whereof I have hereunto set my hand.

HARRY A. WEBSTER.